United States Patent
Song et al.

(10) Patent No.: US 9,790,421 B2
(45) Date of Patent: Oct. 17, 2017

(54) CHOLINE-BASED CROSSLINKER COMPOSITIONS FOR FRACTURING FLUIDS

(71) Applicant: Ecolab USA Inc., Eagan, MN (US)

(72) Inventors: Jingshe Song, Sugar Land, TX (US); Pious Kurian, Sugar Land, TX (US); Joseph Paul Street, Friendswood, TX (US); Rhyn Cason, Houston, TX (US)

(73) Assignee: Ecolab USA Inc., St. Paul, MN (US)

( * ) Notice: Subject to any disclaimer, the term of this patent is extended or adjusted under 35 U.S.C. 154(b) by 558 days.

(21) Appl. No.: 14/248,906

(22) Filed: Apr. 9, 2014

(65) Prior Publication Data

US 2014/0305650 A1 Oct. 16, 2014

Related U.S. Application Data

(60) Provisional application No. 61/810,498, filed on Apr. 10, 2013.

(51) Int. Cl.

| C09K 8/68 | (2006.01) |
|---|---|
| C09K 8/035 | (2006.01) |
| C09K 8/90 | (2006.01) |
| C09K 8/512 | (2006.01) |
| C09K 8/514 | (2006.01) |
| C09K 8/88 | (2006.01) |
| C09K 8/60 | (2006.01) |

(52) U.S. Cl.
CPC .............. *C09K 8/685* (2013.01); *C09K 8/035* (2013.01); *C09K 8/512* (2013.01); *C09K 8/514* (2013.01); *C09K 8/887* (2013.01); *C09K 8/90* (2013.01); *C09K 8/605* (2013.01); *C09K 2208/12* (2013.01)

(58) Field of Classification Search
CPC . C09K 8/035; C09K 8/08; C09K 8/20; C09K 8/467; C09K 8/588; C09K 8/685; C09K 8/90; E21B 43/26
USPC ............................... 507/211, 240; 166/308.3
See application file for complete search history.

(56) References Cited

U.S. PATENT DOCUMENTS

| 4,070,348 A | 1/1978 | Kraemer et al. |
|---|---|---|
| 4,140,639 A | 2/1979 | Jackson et al. |
| 4,151,096 A | 4/1979 | Jackson |
| 4,155,410 A | 5/1979 | Jackson et al. |
| 4,172,801 A | 10/1979 | Jackson |
| RE30,230 E | 3/1980 | Jackson et al. |
| 4,247,402 A | 1/1981 | Hartfiel |
| 4,514,309 A * | 4/1985 | Wadhwa ............... C09K 8/685 166/283 |
| 4,619,776 A | 10/1986 | Mondshine |
| 4,970,340 A | 11/1990 | Smith |
| 5,082,579 A | 1/1992 | Dawson |
| 5,145,590 A | 9/1992 | Dawson |
| 5,160,445 A | 11/1992 | Sharif |
| 5,160,643 A | 11/1992 | Dawson |
| 5,259,455 A | 11/1993 | Nimerick et al. |
| 5,372,732 A | 12/1994 | Harris et al. |
| 5,445,223 A | 8/1995 | Nelson et al. |
| 5,565,513 A | 10/1996 | Kinsey, III et al. |
| 5,607,905 A | 3/1997 | Dobson, Jr. et al. |
| 5,616,541 A | 4/1997 | Dobson, Jr. et al. |
| 5,635,458 A | 6/1997 | Lee et al. |
| 5,641,728 A | 6/1997 | Dobson, Jr. et al. |
| 5,728,652 A | 3/1998 | Dobson, Jr. et al. |
| 5,728,654 A | 3/1998 | Dobson, Jr. et al. |
| 5,783,526 A | 7/1998 | Dobson, Jr. et al. |
| 5,908,814 A | 6/1999 | Patel et al. |
| 6,024,170 A | 2/2000 | McCabe et al. |
| 6,171,386 B1 | 1/2001 | Sabins |
| 6,225,264 B1 | 5/2001 | Moorhouse et al. |
| 6,251,838 B1 | 6/2001 | Moorhouse et al. |

(Continued)

FOREIGN PATENT DOCUMENTS

| EP | 0594364 A1 | 4/1994 |
|---|---|---|
| EP | 0805260 A2 | 11/1997 |
| EP | 1267034 A2 | 12/2002 |
| EP | 1331358 A1 | 7/2003 |

OTHER PUBLICATIONS

International Search Report and Written Opinion issued for PCT/US2014/033511, dated Aug. 11, 2014, 13 pages.
Wartelle, Lynda H. et al., Chromate ion adsorption by agricultural by-products modified with dimethyloldihydroxyethylene urea and choline chloride, Water Research 39 (2005) pp. 2869-2876.
Extended European Search Report dated Nov. 21, 2016 relating to European Application No. 14782992.3, 7 pages.

*Primary Examiner* — Frances Tischler
(74) *Attorney, Agent, or Firm* — Senniger Powers LLP

(57) ABSTRACT

Disclosed are compositions derived of mixtures of choline ion salts (typically choline chloride) in aqueous solution with suspended particulates of sparingly soluble borate minerals or with alkali or alkaline earth borate salts, boric acid and its ester derivatives and salts, or other aqueous soluble borate forms. These compositions are useful as cross-linkers for polysaccharides and other biopolymers and particularly as used in subterranean treatment fluids for completion and stimulation of oil and gas wells. Advantages of the compositions are the combination into a single package of the properties of clay stabilizing actives (choline ion) and crosslinking actives (borates, etc.), in relatively high concentrations, and these compositions are easy to handle, being stable and pumpable at low temperatures, and with attractive environmental profiles. Also disclosed are the analogous choline solutions mixed with metallic cross-linking ions know in the art such as $Zr^+$, $Ti^{4+}$, $Al^{3+}$, & $Fe^{3+}$.

16 Claims, No Drawings

(56) References Cited

U.S. PATENT DOCUMENTS

| | | |
|---|---|---|
| 6,291,405 B1 | 9/2001 | Lee et al. |
| 6,302,209 B1 | 10/2001 | Thompson, Sr. et al. |
| 6,325,149 B1 | 12/2001 | Dobson, Jr. et al. |
| 6,391,830 B1 | 5/2002 | Dobson, Jr. et al. |
| 6,576,597 B2 | 6/2003 | Dobson, Jr. et al. |
| 6,800,593 B2 | 10/2004 | Dobson, Jr. et al. |
| 6,936,575 B2 | 8/2005 | Dobson, Jr. et al. |
| 7,018,956 B2 | 3/2006 | Dobson, Jr. et al. |
| 7,211,546 B2 | 5/2007 | Dobson, Jr. et al. |
| 7,214,647 B2 | 5/2007 | Dobson, Jr. et al. |
| 7,897,544 B2 | 3/2011 | Dobson, Jr. et al. |
| 2003/0144154 A1 | 7/2003 | Dobson, Jr. et al. |
| 2004/0209780 A1 | 10/2004 | Harris et al. |
| 2006/0116296 A1 | 6/2006 | Kippie et al. |
| 2007/0173414 A1 | 7/2007 | Wilson, Jr. |
| 2008/0287325 A1 | 11/2008 | Thompson et al. |
| 2011/0136704 A1 | 6/2011 | Sharma et al. |
| 2012/0118645 A1 | 5/2012 | Wilson, Jr. |

\* cited by examiner

CHOLINE-BASED CROSSLINKER COMPOSITIONS FOR FRACTURING FLUIDS

CROSS-REFERENCE TO RELATED APPLICATIONS

This application claims the benefit of U.S. Provisional Patent Application Ser. No. 61/810,498, filed Apr. 10, 2013, the entirety of which is herein incorporated by reference.

FIELD OF THE INVENTION

The present invention relates to solutions and/or suspensions containing crosslinking agents in an aqueous brine of choline salts and is applied as a time released crosslinker for polymer solutions, methods of using these compositions, and methods of preparing the compositions.

BACKGROUND OF THE INVENTION

Fracturing, or hydraulic fracturing, involves the injection of specialized fluids into geologic formations to create fractures. These fractures, in combination with flow paths drilled by wellbores, allow hydrocarbons, such as oil or natural gas, to flow from the deep recesses of the geologic formations to the ground surface. The injected specialized fluids are called fracturing fluids, which carry proppant into the fractures.

For many years, fracturing fluid technology has centered on a wide range of polymers. Polysaccharides such as guar, hydroxypropyl guar (HPG) and hydroxyethylcellulose (HEC) are the most commonly used polymers to provide the fluid viscosity. Since high viscosities are needed to carry the required amount of proppant, high concentrations of polymer are used and the polymers are frequently crosslinked to achieve the necessary viscosity. Cross-linked polymer gels, such as those based on guar crosslinked with borate or other polymers crosslinked with metal ions, are typically used to attain a sufficient fluid viscosity and thermal stability in high temperature reservoirs.

The crosslinking agents for polysaccharide solutions used in well treating fluids are well known in the art. One common type of crosslinker is transition metal containing compounds including titanium ($4^+$), zirconium ($4^+$), chromium ($3^+$), iron ($3^+$) and aluminum ($3^+$) formulated as a product so as to release transition metal ions when dissolved in an aqueous liquid. The most commonly used crosslinker is based on borate releasing compounds due to its reversibility of crosslinking. The borate source may include easily soluble borate oxides such as boric acid and/or sodium borate (borax). The borate source can also be lowly soluble borate minerals such as ulexite, colemanite, probertite, and mixtures thereof. Products of this type have a technical advantage of delayed crosslinking action upon use, which is a desired property for many fracturing applications, and is a consequence of the low solubility. The borate source can also be a mixture of lowly soluble borate minerals and/or boric acid and/or ester derivatives of boric acid and/or borax and/or alkali borate salts and/or alkali earth borate salts.

In order to add borate or metallic crosslinkers easily and accurately into the fracturing fluids, it is better for the crosslinker to be in a liquid form. In many cases, it is advantageous to have highly concentrated formulations with actives present in excess of their solubility limits, typically dispersed as a suspension of the particular active in an appropriate liquid suspension medium. One common medium is non-aqueous liquids such as hydrocarbon solvents. See U.S. Pat. No. 6,024,170, which is incorporated fully herein by reference.

Numerous problems exist when utilizing non-aqueous suspensions. Many of the non-aqueous liquid suspensions are environmentally unacceptable due to the choice of the oil and have poorer suspension and stability characteristics, and may be more expensive and difficult to prepare.

US 2003/0144154 A1, which is fully incorporated herein by reference, discloses a concentrate for the crosslinking of polymers in aqueous solutions, which comprises an alkali metal formate solution, a crosslinking agent, a suspension agent, and optionally a deflocculant. The preferred alkaline metal formate is potassium formate. The preferred suspension agent is a clay mineral selected from the group consisting of smectite clays, palygorskite clays and mixtures thereof. The key of this technology is the addition of formate salt, which decreases the freezing point of the product and increases the density of the suspension. Under this technology, however, clay minerals are also required.

Solutions of low molecular weight quaternary ammonium compounds have also been used in hydraulic fracturing fluids for their clay stabilizing properties, in which the presence of this type of ion helps prevent the swelling of clay minerals present in the subterranean formation, which come into contact with water as a result of the fracturing operation. Clay swelling and associated fines migration leads to reservoir permeability damage. Tetramethyl ammonium chloride is the historically most used substance in this category, but the natural product choline in the form of its chloride salt has in recent years become the product of choice because of its inherently non-toxic and bio-assimilation properties.

A perhaps lesser appreciated property of choline chloride is the high water solubility (70-75 weight % are typical solution concentrations) and corresponding high solution density and low freezing point. This makes choline chloride solutions ideal media for suspension of dense materials such as sparingly soluble borate minerals and metal ions. Another feature of choline is the hydroxyl functionality, which will react with soluble borate species to yield borate esters. This enables the choline solutions to co-solubilize borate in high percentages and still to retain the desired pour point and pumpability of the overall fluid. Such solutions would advantageously combine multiple fuctions, i.e. clay stabilization and crosslinker actives, into one easily managed and deliverable formulation package.

Accordingly, there is a need for fracturing fluids that are readily hydratable and have controllable viscosity properties through crosslinking that enable efficient and inexpensive pumping and proppant transport down boreholes.

SUMMARY OF INVENTION

The present invention is directed to a composition for crosslinking polymers in aqueous solution comprising a crosslinking agent and a base solution of aqueous choline salt, wherein the crosslinking agent may be in solution or in a suspension. The base solution of the composition may be aqueous choline chloride. The composition may further comprise an alcoholic or polyol co-solvent. The choline chloride based solution may suspend the crosslinking agent. The concentration of the choline chloride in the composition maybe from 5 wt % to 95 wt % of the composition, or 30 wt % to 70 wt % of the composition. The concentration of the co-solvent in the composition maybe from 1 wt % to 50 wt % of the composition, 1 wt % to 30 wt % of the composition, or from 5 wt % to 15 wt % of the composition. The co-solvent of the composition is methanol, ethanol, 1- or 2-propanol, ethylene glycol, propylene glycol, glycerol, alkyloxyethanol ethers, diethylene glycol, alkyldiethyleglycol ethers, or mixtures thereof. The composition may further comprise a biocide or a pH adjuster, or an antioxidant, or combinations thereof.

The crosslinking agent of the composition may be transition metal containing compounds selected from the group consisting of titanium ($4^+$), zirconium ($4^+$) chromium ($3^+$) iron ($3^+$) and aluminum ($3^+$), releasing transition metal ions when dissolved in an aqueous liquid. The crosslinking agent may be a borate releasing compound. The crosslinking agent may be a mixture of a sparingly soluble alkali/alkaline earth metal borate and a slightly soluble borate. The crosslinking agent may be a sparingly soluble borate mineral selected from the group consisting of ulexite, colemanite, probertite, and a mixtures thereof; or a slightly soluble borate and/or borate oxides selected from the group consisting of boric acid, common borax, sodium tetraborate, other alkali or alkaline earth borate hydrates or mixtures thereof; or mixtures of (a) and (b). The concentration of the crosslinking agent in the composition is from 5 wt % to 60 wt % of the composition, or 15 wt % to 45 wt % of the composition.

The present invention is also directed to a fracturing fluid or well service fluid composition comprising a hydrated polysaccharide crosslinked with the composition as described above. The present invention is also directed to a method for recovering hydrocarbons, the method comprising (a) providing the fracturing fluid composition, (b) injecting/pumping the fracturing fluid composition from a ground surface into a geologic formation/fracture; (c) allowing the fracturing fluid to flow to the point of contact with the hydrocarbon; and (d) recovering the hydrocarbon from the geologic formation/fracture at the ground surface.

DETAILED DESCRIPTION

The invention is directed to concentrate for crosslinking polymers in aqueous solutions for purposes of using in hydraulic fracturing. Hydraulic fracturing is a process to enhance the production of oil and gas from wells drilled through hydrocarbon bearing subterranean formations. It can also be used to improve the water injection characteristics of water injection wells used to support hydrocarbon production in water flood projects. Most often, the process occurs by injecting a viscous fluid through the well tubulars at suitable rates and pressure, allowing the formation in contact with the tubulars to respond by fracturing.

The composition comprises a crosslinking agent, a choline chloride solution, and alternatively a co-solvent. The crosslinking agent may be a borate releasing compound. The choline chloride solution is used as the medium to suspend the crosslinking agent particles. Choline chloride is also a clay control agent in fracturing fluids, therefore choline chloride plays dual functions as the clay control agent and the medium for the concentrate. The co-solvent is water, alcohols, polyols or a mixture thereof.

Borate crosslinked gel fracturing fluids utilize borate ions to crosslink the hydrated polymers and provide increased viscosity. The crosslinking obtained by using borate is reversible and is triggered by altering the pH of the fluid system. The reversible characteristic of the crosslinking in borate fluids helps them clean up more effectively, resulting in good regained permeability and conductivity.

1. Definitions

The terminology used herein is for the purpose of describing particular embodiments only and is not intended to be limiting. As used in the specification and the appended claims, the singular forms "a," "and" and "the" include plural references unless the context clearly dictates otherwise.

The term "alcohol", as used herein, is an alkyl group, as defined herein, wherein one of the hydrogen atoms of the alkyl group is replaced with a hydroxy group, as defined herein. Representative examples of an alcohol include, but are not limited to, methanol, ethanol, n-propanol, isopropanol, butanol, and tert-butanol.

The term "alkyl", as used herein, refers to a linear or branched chain hydrocarbon containing from 1 to 24 carbon atoms. Representative examples of an alkyl include, but are not limited to, methyl, ethyl, propyl, butyl, pentyl, and hexyl.

The term "alkali metal", as used here, refers to the chemical elements Li, Na, K, Rb, Cs, and Fr.

The term "alkali earth metal", as used herein, refers to the chemical elements Be, Mg, Ca, Sr, Ba, and Ra.

The term "aryl", as used herein, refers to a phenyl group or naphthyl group.

The term "hydroxy", as used herein, refers to an —OH group.

The term "polyol", as used herein, is an alkyl group, as defined herein, wherein two or more hydrogen atoms of the alkyl group are replaced with hydroxy groups, as defined herein. Representative examples of an polyol include, but are not limited to, ethylene glycol, propylene glycol, and glycerol, saccharides and carbohydrates.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

2. Crosslinker Composition

The present invention is directed to a crosslinker composition for polymers in an aqueous solution for purposes of fracturing. The crosslinker composition comprises a crosslinking agent, a choline chloride solution, and a co-solvent. The crosslinker composition may be a suspension of the crosslinking agent in a choline chloride and co-solvent solution. Clay stabilizers are routinely added to aqueous stimulation and completion fluids. Choline chloride is one of the very well-known clay stabilizers used in hydraulic fracturing industry. It has been reported that the mechanism by which ionic stabilizers works is by the ionic interaction of the stabilizer to the fines from the soil. A similar stabilization mechanism is present between choline chloride and the finely ground ulexite to provide a stable suspension.

The polymers may be hydrated, water-soluble polymers suitable for generation of a crosslinked fracturing fluid when combined with the crosslinker composition. The water-souble polymers may be any hydratable polysaccharide that is capable of gelling in the presence of the crosslinker composition to form a gelled base fracturing fluid. Suitable hydratable polysaccharides may be polyol-containing synthetic polymers, galactomannan gums, glucomannan gums, guars, derivatized guars and cellulose derivatives including, but not limited to, guar gum, guar gum derivatives, locust bean gum, tara gum, karaya gum, cassia gum, carboxymethyl cellulose, carboxymethylhydroxyethyl cellulose and hydroxyethyl cellulose. Preferred water-soluble polymers include, but are not limited to, guar gum, hydroxypropyl guar, carboxymethyl guar, carboxymethylhydroxypropyl guar and carboxymethylhydroxyethyl cellulose. Polyol-containing synthetic polymers may be polyvinylalcohol co-polymers and copolymers with polyol side chain groups based on acrylamide, acrylates, and methacrylates.

The polymer may be present in the gel based fracturing fluid at between 0.001 and 5 weight percent, between 0.005 and 4 weight percent, between 0.01 and 3 weight percent, between 0.05 and 2 weight percent, between 0.1 and 1 weight percent, between 0.5 and 3 weight percent, between 1 and 4 weight percent, between 2 and 5 weight percent, between 3 and 5 weight percent, or between 1 and 5 weight percent.

The gel based fracturing fluid may further contain a proppant.

a. Choline Chloride and Co-Solvent Solution

The crosslinker composition comprises a choline chloride solution and a co-solvent. The choline chloride, which has the following structure:

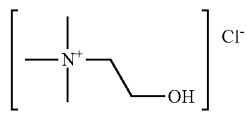

is a clay control agent in fracturing fluids and along with the co-solvent, provides a medium for the overall crosslinker composition. Choline chloride is commonly available at a 70-75 weight % solution in water. Choline chloride solution has a freezing point of minus 23° C. (−9.4° F.). The choline chloride solution provides a uniform dispersed suspension of the crosslinking agent without the need for other suspension aids such as clays or polymeric dispersants.

The co-solvent may be water, alcohols, polyols or a mixture thereof. The combination of choline chloride and the co-solvent provide a stable, aqueous solution for the crosslinking agent. The stable aqueous solution of the co-solvent and choline chloride provides the means to thoroughly disperse the crosslinking agents as described below. The co-solvents can be used to make the choline chloride solution. The co-solvents may be further used to combine the choline chloride with the crosslinking agent.

b. Crosslinking Agent

The crosslinker composition comprises a crosslinking agent. The crosslinking agent may be a borate releasing compounds.

The borate compound may be boric acid, neutralized boric acid, borax, other alkali borates of various states of hydration, other natural mineral forms boronoxides including ulexite, colemanite, probertite, sassolite, nordenskioldine, tusionite, jimboite, kotoite, takedaite, hambergite, berborite, jeremejevite, warwickite, yuanfuliite, karlite, azoproite, bonaccordite, fredrikssonite, ludwigite, vonsenite, pinakiolite, blatterite, orthopinakiolite, takeuchiite, chestermanite, hulsite, magnesiohulsite, aluminomagnesiohulsite, hydroxylborite, fluoborite, shabynite, wightmanite, guadefroyite, sakhaite, harkerite, pertsevite, jacquesdietrichite, painite, sinhalite, pseudosinhalite, behierite, schiavinatoite, frolovite, hexahydroborite, henmilite, bandylite, teepleite, moydite, carboborite, sulfoborite, luneburgite, seamanite, cahnite, suanite, clinokurchatovite, kurchatovite, sussexite, szaibelyite, wiserite, pinnoite, pentahydroborite, calciborite, aldzhanite, vimsite, sibirskite, parasibirskite, santarosaite, ameghinite, inderite, kurnakovite, inderborite, meyerhofferite, inyoite, solongoite, peprossiite, nifontovite, olshanskyite, hydroboracite, howlite, jarandolite, johachidolite, borax, tincalconite, hungchaoite, fedorovskite, roweite, hydrochlorborite, uralborite, numanoite, borcarite, kernite, diomignite, sborgite, ramanite, santite, ammonioborite, larderellite, ezcurrite, tertschite, priceite, biringuccite, nasinite, gowerite, veatchite, volkovskite, tuzlaite, heidornite, brianroulstonite, tyretskite, hilgardite, kurgantaite, aksaite, mcallisterite, admontite, rivadavite, teruggite, aristarainite, kaliborite, nobleite, tunellite, balavinskite, strontioborite, ginorite, strontioginorite, fabianite, boracite, chambersite, ericaite, congolite, trembathite, studenitsite, penobsquisite, preobrazhenskite, walkerite, rhodizite, londonite, ruitenbergite, pringleite, metaborite, chelkarite, braitschite, satimolite, iquiqueite, wardsmithite, korzhinskite, halurgite, ekaterinite, vitimite, canavesite, qilianshanite, or mixtures thereof. The borate compound may be Probertite ($NaCaB_5O_9.5H_2O$), Ulexite ($NaCaB_5O9.8H_2O$), Nobleite ($CaB_6O_{10}.4H_2O$), Gowerite ($CaB_6O_{10}.5H_2O$), Frolovite ($Ca_2B_4O_8.7H_2O$), Colemanite ($Ca_2B_6O_{11}.5H_2O$), Meyerhofferite ($Ca_2B_6O_{11}.7H_2O$), Inyoite ($Ca_2B_6O_{11}.13H_2O$), Priceite ($Ca_4B_{10}O_{19}.7H_2O$), Tertschite ($Ca_4B_{10}O_{19}.20H_2O$), Ginorite ($Ca_2B_{14}O_{23}.8H_2O$), Pinnoite ($MgB_2O_4.3H_2O$), Paternoite ($MgB_8O_{13}.4H_2O$), Kurnakovite ($Mg_2B_6O_{11}.15H_2O$), Inderite ($Mg_2B_6O_{11}.15H_2O$) Preobmzhenskite ($Mg_3B_{10}O_{18}.4.5H_2O$), Hydroborite ($CaMgB_6O_{11}.11H_2O$), Inderborite ($CaMgB_6O_{11}.11H_2O$), Kaliborite (Heintzite) ($KMg_2B_{11}O_{19}.9H_2O$), Veatchite ($SrB_6O_{10}.2H_2O$), or mixtures thereof.

The crosslinking agent may further comprise any transition metal including elements of Groups 3-12 and periods 4-7 as well as aluminum. The transition metal may be titanium ($4^+$), zirconium ($4^+$) chromium ($3^+$), iron ($3^+$), or aluminum ($3^+$).

c. Delayed and Immediate Crosslinker Composition

The crosslinker composition as discussed above may be used for crosslinking polymers in an aqueous solution for purposes of hydraulic fracturing, and may be an immediate crosslinker composition or a delayed crosslinker composition. An immediate crosslinker composition is a crosslinker composition that contains particular crosslinking agents at a particular ratio to the choline chloride and co-solvent levels. The crosslinking is the elapsed time between the uniform additions of the crosslinker composition to the base polymer fluid up to the time of fluid gelation of the fracturing composition. The crosslinking time resulting from an immediate crosslinker composition may be 1 second, 2 seconds, 3 seconds, 4 seconds, 5 seconds, 6 seconds, 7 seconds, 8 seconds, 9 seconds, 10 seconds, 11 seconds, 12 seconds, 13 seconds, 14 seconds, 15 seconds, 16 seconds, 17 seconds, 18 seconds, 19 seconds, or 20 seconds.

A delayed crosslinker composition is a crosslinker composition that contains also a particular crosslinking agent at a particular ratio to the choline chloride and co-solvent levels. The delayed crosslinker composition may have a particular delay time. Delay time is defined as the elapsed time between the uniform additions of the crosslinker composition to the base polymer fluid, up to the time of fluid gelation. The delay times span the extreme ranges of those produced by simple solutions of fully soluble alkali or alkaline earth borates (seconds) and those of suspensions of sparingly soluble borate minerals (minutes). A delay time may be the elapsed time between uniform addition of the delayed crosslinker composition to the base polymer fluid up to the time of fracturing fluid gelation and may include a time span of 20 seconds, 21 seconds, 22 seconds, 23 seconds, 24 seconds, 25 seconds, 26 seconds, 27 seconds, 28 seconds, 29 seconds, 30 seconds, 31 seconds, 32 seconds, 33 seconds, 34 seconds, 35 seconds, 36 seconds, 37 seconds, 38 seconds, 39 seconds, 40 seconds, 41 seconds, 42 seconds, 43 seconds, 44 seconds, 45 seconds, 46 seconds, 47 seconds, 48 seconds, 49 seconds, 50 seconds, 51 seconds, 52 seconds, 53 seconds, 54 seconds, 55 seconds, 56 seconds, 57 seconds, 58 seconds, 59 seconds, 1 minute, 2 minutes, 3 minutes, 4 minutes, 5 minutes, 6 minutes, 7 minutes, 8 minutes, 9 minutes, 10 minutes, 11 minutes, 12 minutes, 13 minutes, 14 minutes, 15 minutes, 16 minutes, 17 minutes, 18 minutes, 19 minutes, 20 minutes, 21 minutes, 22 minutes, 23 minutes, 24 minutes, 25 minutes, 26 minutes, 27 minutes, 28 minutes, 29 minutes, 30 minutes, 31 minutes, 32 minutes, 33 minutes, 34 minutes, 35 minutes, 36 minutes, 37 minutes, 38 minutes, 39 minutes, 40 minutes, 41 minutes, 42 minutes, 43 minutes, 44 minutes, 45 minutes, 46 minutes, 47 minutes, 48 minutes, 49 minutes, 50 minutes, 51 minutes, 52 minutes, 53 minutes, 54 minutes, 55 minutes, 56 minutes, 57 minutes, 58 minutes, 59 minutes, 60 minutes, 1.5 hours, 2.0 hours, 2.5 hours, or 3.0 hours.

The crosslinking time resulting from the use of the crosslinker composition can be controlled by varying any one or all of the following: 1) the crosslinking agent used, 2) the particle size of the crosslinking agent in suspension, 3) the pH of the fracturing fluid prior to the addition of the crosslinker composition suspension, 4) the concentration (i.e., loading) of the crosslinking agent or suspension in the fracturing liquid, 5) the type of crosslinking agent content in the suspension, and 6) the temperature of the fracturing fluid.

(1) Type of Crosslinking Agent Used

The crosslinking time resulting from use of the crosslinker composition can be controlled by the type of crosslinking agent used. For example, when used under similar conditions, the type of borate compound (i.e., alkali or alkaline earth borates, boric acid and its esters and salts and sparingly soluble ulexite, colemanite, probertite and/or mixtures of any of these) may be employed effectively to control the exact crosslinking time of the polymers in the overall fracturing fluid according to the prevailing amount of freely available soluble borate species. Accordingly, solutions/suspensions of mixtures of both alkali or alkaline earth borates and sparingly soluble borate minerals will crosslink water-soluble polymer solutions over a range of effective times and may fall anywhere in the range of immediate to delayed crosslinking times.

(2) Particle Size of the Crosslinking Agent

Particle size of the crosslinking agent may affect the crosslinking time of the fracturing fluid polymers. For example, with respect to the particle size of the suspended borate sources, as particle size increases, the time required for the crosslinking of a water-soluble polymer solution increases. Conversely, as the particle size decreases, the time required for the crosslinking of a water-soluble decreases. Particle sizes of the borate sources suitable for suspension in the aqueous solvent, range from about 20 mesh to about 400 mesh. Particle sizes may be 20 mesh, 30 mesh, 40 mesh, 50 mesh, 60 mesh, 70 mesh, 80 mesh, 90 mesh, 100 mesh, 110 mesh, 120 mesh, 130 mesh, 140 mesh, 150 mesh, 160 mesh, 170 mesh, 180 mesh, 190 mesh, 200 mesh, 210 mesh, 220 mesh, 230 mesh, 240 mesh, 250 mesh, 260 mesh, 270 mesh, 280 mesh, 290 mesh, 300 mesh, 310 mesh, 320 mesh, 330 mesh, 340 mesh, 350 mesh, 360 mesh, 370 mesh, 380 mesh, 390 mesh, or 400 mesh. Combinations of differing mesh sizes may be used. Accordingly, depending upon the particle size of the crosslinking agent, the crosslinking agent may crosslink water-soluble polymer solutions over a range of effective times and be categorized as immediate or delay crosslinking composition.

(3) pH of the Polymers

The pH of the polymer solution prior to its crosslinking may be used to control crosslinking time. The pH of the polymer solution affects the solubility rate of the crosslinker composition based on sparingly soluble mineral forms of the crosslinker. For example, a delayed borate based crosslinker composition may delay the crosslinking of water-soluble polymers when using a sparingly soluble mineral form such as ulexite or colmanite. Accordingly, depending upon the pH of the polymer solutions, the crosslinking agent may crosslink polymer solutions over a range of effective times and be categorized as immediate or delayed crosslinker composition.

(4) The Concentration and Type of the Crosslinking Agent in Overall Fracturing Fluid The concentration of the crosslinking agent in the overall fracturing fluid may be used to control the crosslinking time. For example, both the concentration (i.e., loading) of the stable, aqueous suspension of a sparingly soluble borate mineral in the water-soluble polymer solution and the content of the borate in the crosslinker suspension affect the crosslinking time of a water-soluble polymer solution similarly. As either the concentration of the suspension of a sparingly soluble borate mineral in the water-soluble polymer solution or the content of the borate in the crosslinker suspension increase, the crosslinking time of the water-soluble polymer solution decreases. Conversely, as either the concentration of the suspension of a sparingly soluble borate mineral in the water-soluble polymer solution and the content of the borate in the crosslinker suspension decrease, the crosslinking time of the water-soluble polymer solution increases. Accordingly, depending upon the concentration of crosslinking agent in the water-soluble polymer solution and the content of the crosslinking agent in the crosslinker composition, the crosslinking agent may crosslink polymer solutions over a range of effective times and be categorized as immediate or delayed crosslinker composition.

(5) Temperature of the Crosslinking Process

Temperature may be used to alter the crosslinking time of a water-soluble polymer solution. As the temperature of the water-soluble polymer solution increases, its crosslinking time decreases. Conversely, as the temperature of the water-soluble polymer solution decreases, its crosslinking time increases.

(6) Other Means to Affect Crosslinking Time of the Polymer

An instant crosslinking agent may be a readily soluble form of crosslinking agent such as borax ($Na_2B_4O_7 \cdot 10H_2O$) or boric acid ($H_3BO_3$). In these cases, a considerable proportion of freely available borate species is in full solution in the choline chloride medium either as free ions or as mixed-partial borate esters with choline. It is also a property of these formulations that supersaturated stable suspensions can be achieved with high loading of the borate source and which utilize the density suspension properties of the base choline chloride solution. This is advantageous for the preparation of highly active (e.g., 50%) compositions which are yet fluids with low freezing points.

A delayed crosslinker largely remains in suspended form in the composition and only slowly dissolves when added into the full volume of the gel fracturing fluid. The "delay time" is readily adjusted or tuned by both the choice of sparingly soluble mineral and associated co-solvents and depends upon the low prevailing amount of soluble borate species in the total composition.

One simple and direct method of tuning comes from adjusting the relative proportion of co-solvent of the composition—thus higher co-solvent levels yields higher soluble borate species and shorter crosslink delays, while lower co-solvent yields the reverse. Another direct method arises by the co-addition of a small proportion of readily soluble borate such as borax, boric acid, etc.

3. Methods Of Preparing The Crosslinker Composition And Overall Fracturing Fluid The present invention is also directed to a method for making the crosslinker composition by combining the crosslinking agent, choline chloride and co-solvents. Several methods are provided below.

One embodiment of the method of synthesizing the crosslinker composition includes the steps of first making the aqueous solution of choline salt with or without co-solvents and then suspending/dissolving the crosslinking agent in the aqueous solvent phase. Another embodiment of the method of synthesizing the crosslinker composition includes the steps of (1) first mixing the crosslinking agent and powdered choline chloride to form a dry mixture; and (2) suspending/dissolving the dry mixture of the crosslinking agent and choline chloride in an aqueous solvent such as water or a mixture of water and alcoholic co-solvent.

An alternative embodiment of the method includes preparing a stable, aqueous suspension/solution of a crosslinking agent, the base medium is first prepared by mixing the co-solvent with an aqueous choline chloride solution to form a mixed solvent. The crosslinking agent is then suspended/dissolved into the mixed solvent to form the stable, aqueous suspension/solution of the crosslinker composition. The resulting stable, aqueous suspension/solution of the crosslinking agent forms a uniform stable composition that is added to a hydrated water-soluble polymer solution for creating a cross-linked gel when adjusted to a suitable pH for the crosslinking reaction.

Another embodiment of the method includes preparing a stable, aqueous suspension/solution of a crosslinking agent that includes a first step of mixing the crosslinking agent and the choline chloride to form a dry mixture. The second step includes suspending/dissolving the dry mixture of the crosslinking agent and the choline chloride in an aqueous solvent. The dry mixture of the crosslinking agent and the choline chloride is stable, which permits its storing and shipment prior to suspension in the aqueous co-solvent. This method, therefore, reduces shipping costs by permitting the shipment of the dry mixture of the crosslinking agent and the choline chloride, which is then mixed on-site with the aqueous solvent. The resulting stable, aqueous suspension/solution of the crosslinking agent forms a uniform stable composition that is added to a hydrated water-soluble polymer solution for creating a fracturing fluid.

Using any one of the above-described methods, the crosslinker composition is prepared by mixing the crosslinking agent in a range of from about 1% to 60% by weight and the aqueous solvent in a range of from about 40% to 99% by weight of the total crosslinking composition.

The crosslinker composition may be prepared by mixing the crosslinking agent in about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59° A, or 60% by weight and the base solvent medium in about 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, or 99% by weight.

In an alternative embodiment of the method for synthesizing the crosslinker composition including preparing a stable, aqueous suspension/solution of a crosslinking agent with a non-neutralized solution of choline. Choline is produced from the addition reaction of trimethylamine to ethylene oxide. The resulting choline zwitterionic reaction product is then typically neutralized with HCl or with other suitable acids ($H_2SO_4$ being one other acid commercially employed) to yield the stable salt product of choice. In this method, a solution of choline is neutralized directly with a crosslinking agent such as boric acid (or other boron oxide anhydrous acid forms) to directly yield a choline borate complex solution. The resulting stable, aqueous suspension/solution of the borate crosslinker forms a uniform stable composition that is added to a hydrated water-soluble polymer solution for creating a cross-linked gel when adjusted to a suitable pH for the crosslinking reaction.

The stable, aqueous suspensions of the crosslinking agent with a solution of choline and optionally a co-solvent typically have less than one percent of the suspension separate after storage for 24 hours at room temperature. This settling can be measured by storing the suspension in a long, capped vial and determining the top clearance. This top clearance is generally determined by measuring the portion of the top of the liquid to the line separating the liquid from the suspension and dividing this portion by the total amount of the liquid. Top clearance data for a typical stable, aqueous suspension of the invention is shown in Example 5.

The stable, aqueous suspensions of the crosslinking agent with a solution of choline and optionally a co-solvent generally are easily resuspended after several weeks of storage. Preferably, the stable, aqueous suspension of the invention would be resuspended with about 30 to about 60 minutes of continuous recirculation after storage; more preferably, the suspension would be resuspended with about 30 minutes of continuous recirculation after storage. For example, after more than 8 weeks of storage, a 265 gallon tote containing a stable, aqueous suspension of the invention would be resuspended with about 30 to about 60 minutes of continuous recirculation through a pump conventionally fitted to the tote.

4. Overall Fracturing Fluid Or Well Service Fluid

As described above, the crosslinker composition may be combined with the water soluble polymers discussed above to form the cross-linked fracturing fluid that is in a form of a gel. The same fluid composition may be useful as a mobility control fluid in secondary or tertiary oil recovery systems, in completion fluids, in cement applications, and/or in drilling mud formulations.

a. Other Additives to the Overall Fracturing Fluid or Well Service Composition

The overall fracturing fluid or well service fluid composition may further optionally include one or more additives. Suitable additives include, but are not limited to, proppants, surfactants, solvents, corrosion inhibitors, scale inhibitors, emulsifiers, dispersants, emulsion breakers, hydrogen sulfide scavengers, clay stabilizers (clay control agents), breakers, biocides, pH modifiers, synergistic compounds, asphaltene inhibitors, paraffin inhibitors, and antioxidants.

(1) Proppant

The fracturing fluid or well service fluid composition may further contain a proppant. The proppant may be sand, bauxite, a man-made ceramic, glass beads, or a combination thereof, for example. The sand may be silica sand or resin-coated sand. These vary depending on the type of permeability or grain strength needed for a particular application. Sand containing naturally radioactive minerals may be used so that the fracture trace along the wellbore can be measured. The proppant may be between 10 and 50 mesh, 15 and 45 mesh, 20 and 40 mesh, 25 and 35 mesh, 27 and 33 mesh, or between 20 and 40 mesh.

(2) Surfactants

The fracturing fluid or well service fluid composition may further comprise a surfactant. The surfactant may be a cationic surfactant, an anionic surfactant, an amphoteric surfactant, a zwitterionic surfactant or a non-ionic surfactant. In some embodiments, a surfactant may aid in improving the recovery of oil from the formation. A surfactant may be included in the composition in an amount of about 100 ppm to about 10000 ppm, e.g., 100 ppm, 200 ppm, 300 ppm, 400 ppm, 500 ppm, 600 ppm, 700 ppm, 800 ppm, 900 ppm, 1000 ppm, 2000 ppm, 3000 ppm, 4000 ppm, 5000 ppm, 6000 ppm, 7000 ppm, 8000 ppm, 9000 ppm, or 10000 ppm.

Suitable surfactants include, but are not limited to, anionic surfactants, cationic surfactants, and nonionic surfactants. Anionic surfactants include alkyl aryl sulfonates, olefin sulfonates, paraffin sulfonates, alcohol sulfates, alcohol ether sulfates, alkyl carboxylates and alkyl ether carboxylates, and alkyl and ethoxylated alkyl phosphate esters, and mono- and di-alkyl sulfosuccinates and sulfosuccinamates. Suitable anionic surfactants include alkyl or alkyl ether sulfates and sulfonates, such as $C_{14}$-$C_{24}$ alpha olefin sulfonates, $C_{13}$-$C_{18}$ alcohol ether sulfates, $C_{15}$-$C_{17}$ internal olefin sulfonates, and $C_{12}$-$C_{18}$ ester sulfonates. Cationic surfactants include alkyl trimethyl quaternary ammonium salts, alkyl dimethyl benzyl quaternary ammonium salts, dialkyl dimethyl quaternary ammonium salts, and imidazolinium salts. Nonionic surfactants include alcohol alkoxylates, alkylphenol alkoxylates, block copolymers of ethylene, propylene and butylene oxides, alkyl dimethyl amine oxides, alkyl-bis(2-hydroxyethyl)amine oxides, alkyl amidopropyl dimethyl amine oxides, alkylamidopropyl-bis(2-hydroxyethyl)amine oxides, alkyl polyglucosides, polyalkoxylated glycerides, sorbitan esters and polyalkoxylated sorbitan esters, and alkoyl polyethylene glycol esters and diesters. Also included are betaines and sultanes, amphoteric surfactants such as alkyl amphoacetates and amphodiacetates, alkyl amphopropionates and amphodipropionates, and alkyliminodipropionate.

For example, suitable surfactants can be any of the following: siloxanes, sulfobetaine fluorocarbons, amine oxide fluorocarbons, ethoxylated nonylphenol type fluorocarbons, ethoxylated alcohol type fluorocarbons, fluoropolymers, betaines, amine oxides, ethoxylated nonylphenols, ethoxylated alcohol olefin sulfonates and ether sulfonates.

(3) Corrosion Inhibitors

The fracturing fluid or well service fluid composition may further comprise a corrosion inhibitor. Suitable corrosion inhibitors include, but are not limited to, amidoamines, quaternary amines, amides, alkynes, aldehydes, Mannich reaction products, and phosphate esters.

(4) Scale Inhibitors

The fracturing fluid or well service fluid composition may further comprise a scale inhibitor. Suitable scale inhibitors include, but are not limited to, phosphates, phosphate esters, phosphoric acids, phosphonates, phosphonic acids, polyacrylamides, salts of crylamide-methyl propane sulfonate/acrylic acid copolymer (AMPS/AA), phosphinated maleic copolymer (PHOS/MA), and salts of a polymaleic acid/acrylic acid/crylamide-methyl propane sulfonate terpolymer (PMA/AMPS).

(5) Emulsifiers

The fracturing fluid or well service fluid composition may further comprise an emulsifier. Suitable emulsifiers include, but are not limited to, salts of carboxylic acids, products of acylation reactions between carboxylic acids or carboxylic anhydrides and amines, and alkyl, acyl and amide derivatives of saccharides (alkyl-saccharide emulsifiers).

(6) Dispersants

The fracturing fluid or well service fluid composition may further comprise a dispersant. Suitable dispersants include, but are not limited to, aliphatic phosphonic acids with 2-50 carbons, such as hydroxyethyl diphosphonic acid, and aminoalkyl phosphonic acids, e.g. polyaminomethylene phosphonates with 2-10 N atoms e.g. each bearing at least one methylene phosphonic acid group; examples of the latter are ethylenediamine tetra(methylene phosphonate), diethylenetriamine penta(methylene phosphonate) and the triamine- and tetramine-polymethylene phosphonates with 2-4 methylene groups between each N atom, at least 2 of the numbers of methylene groups in each phosphonate being different. Other suitable dispersion agents include lignin or derivatives of lignin such as lignosulfonate and naphthalene sulfonic acid and derivatives.

(7) Emulsion Breakers

The fracturing fluid or well service fluid composition may further comprise an emulsion breaker. Suitable emulsion breakers include, but are not limited to epoxylated and propoxylated compounds, anionic cationic and nonionic surfactants, and resins, such as phenolic and epoxide resins.

(8) Hydrogen Sulfide Scavengers

The fracturing fluid or well service fluid composition may further comprise a hydrogen sulfide scavenger. Suitable additional hydrogen sulfide scavengers include, but are not limited to, oxidants (e.g., inorganic peroxides such as sodium peroxide, or chlorine dioxide), aldehydes (e.g., of 1-10 carbons such as formaldehyde or glutaraldehyde or (meth)acrolein), triazines (e.g., monoethanol amine triazine, and monomethylamine triazine), and glyoxal. In certain embodiments, blending the compounds and compositions of the invention with MMA triazines lowers or eliminates offensive MMA odors.

(9) Biocides

The fracturing fluid or well service fluid composition may further comprise a biocide. Any biocide suitable in oilfield operations may be used. A biocide may be included in a composition in an amount of about 0.1 ppm to about 1000 ppm, e.g., 0.1 ppm, 0.5 ppm, 1 ppm, 2 ppm, 3 ppm, 4 ppm, 5 ppm, 6 ppm, 7 ppm, 8 ppm, 9 ppm, 10 ppm, 20 ppm, 30 ppm, 40 ppm, 50 ppm, 60 ppm, 70 ppm, 80 ppm, 90 ppm, 100 ppm, 200 ppm, 300 ppm, 400 ppm, 500 ppm, 600 ppm, 700 ppm, 800 ppm, 900 ppm, or 1000 ppm.

Suitable biocides include, but are not limited to, oxidizing and non-oxidizing biocides. Suitable non-oxidizing biocides include, for example amine-type compounds (e.g., quaternary amine compounds and cocodiamine), halogenated compounds (e.g., bronopol and 2-2-dibromo-3-nitrilopropionamide (DBNPA)), sulfur compounds (e.g., isothiazolone, carbamates, and metronidazole), and quaternary phosphonium salts (e.g., tetrakis(hydroxymethyl)phosphonium sulfate (THPS)). Suitable oxidizing biocides include, for example, sodium hypochlorite, sodium chlorite, trichloroisocyanuric acids, dichloroisocyanuric acid, calcium hypochlorite, lithium hypochlorite, chlorinated hydantoins, stabilized sodium hypobromite, activated sodium bromide, brominated hydantoins, chlorine dioxide, ozone, and peroxides.

(10) pH Modifiers

The fracturing fluid or well service fluid composition may further comprise a pH modifier. Suitable pH modifiers include, but are not limited to, alkali hydroxides, alkali carbonates, alkali bicarbonates, alkaline earth metal hydroxides, alkaline earth metal carbonates, alkaline earth metal bicarbonates and mixtures or combinations thereof. Exemplary pH modifiers include NaOH, KOH, $Ca(OH)_2$, CaO, $Na_2CO_3$, $KHCO_3$, $K_2CO_3$, $NaHCO_3$, MgO, and $Mg(OH)_2$.

(11) Asphaltene Inhibitors

The fracturing fluid or well service fluid composition may further comprise an asphaltene inhibitor. Suitable asphaltene inhibitors include, but are not limited to, aliphatic sulfonic acids; alkyl aryl sulfonic acids; aryl sulfonates; lignosulfonates; alkylphenol/aldehyde resins and similar sulfonated resins; polyolefin esters; polyolefin imides; polyolefin esters with alkyl, alkylenephenyl or alkylenepyridyl functional groups; polyolefin amides; polyolefin amides with alkyl, alkylenephenyl or alkylenepyridyl functional groups; polyolefin imides with alkyl, alkylenephenyl or alkylenepyridyl functional groups; alkenyl/vinyl pyrrolidone copolymers; graft polymers of polyolefins with maleic anhydride or vinyl imidazole; hyperbranched polyester amides; polyalkoxylated asphaltenes, amphoteric fatty acids, salts of alkyl succinates, sorbitan monooleate, and polyisobutylene succinic anhydride.

(12) Paraffin Inhibitors

The fracturing fluid or well service fluid composition may further comprise a paraffin inhibitor. Suitable paraffin inhibitors include, but are not limited to, paraffin crystal modifiers, and dispersant/crystal modifier combinations. Suitable paraffin crystal modifiers include, but are not limited to, alkyl acrylate copolymers, alkyl acrylate vinylpyridine copolymers, ethylene vinyl acetate copolymers, maleic anhydride ester copolymers, branched polyethylenes, naphthalene, anthracene, microcrystalline wax and/or asphaltenes. Suitable dispersants include, but are not limited to, dodecyl benzene sulfonate, oxyalkylated alkylphenols, and oxyalkylated alkylphenolic resins.

(13) Antioxidants

In some embodiments, the fracturing fluid or well service fluid composition may further comprise an antioxidant. Any antioxidant suitable in oilfield operations may be used. Exemplary antioxidants include but are not limited to sulfites, thiocyanates and thiosulfates. An antioxidant may be included in a composition in an amount of about 1 ppm to about 1000 ppm, e.g., 1 ppm, 2 ppm, 3 ppm, 4 ppm, 5 ppm, 6 ppm, 7 ppm, 8 ppm, 9 ppm, 10 ppm, 20 ppm, 30 ppm, 40 ppm, 50 ppm, 60 ppm, 70 ppm, 80 ppm, 90 ppm, 100 ppm, 200 ppm, 300 ppm, 400 ppm, 500 ppm, 600 ppm, 700 ppm, 800 ppm, 900 ppm, or 1000 ppm.

(14) Other Components in Fracturing Fluid

The fracturing fluid or well service fluid composition may contain salts including, for example, inorganic salts. The inorganic salts may be chlorides of ammonium, sodium, and potassium. The salts may be organic, such as sodium salicylate. The salt may be potassium chloride (KCl). The KCl may be 1-5% weight percent. The salts may be present in concentrations of between 0.05 and 12 weight percent, between 0.1 and 11 weight percent, between 0.5 and 10 weight percent, between 1 and 9 weight percent, between 2 and 8 weight percent, between 3 and 7 weight percent, between 4 and 6 weight percent, between 0.1 and 15 weight percent, between 0.1 and 12 weight percent, or between 0.1 and 10 weight percent. The salt may be present at 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 3.4, 3.5, 3.6, 2.7, 2.8, 2.9, or 3.0 weight percent, for example. The salts may be added to a concentrated fracturing fluid prepared in fresh water. The salts may be 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, 10%, 11%, 12%, 13%, 14%, 15%, 16%, 17%, 18%, 19% or 20% weight percent of the fracturing fluid.

Radioactive tracers may be added to the fracturing fluid. Such tracers may be used to determine the injection profile and location of fractures created by fracturing. The tracer may be a gamma-emitting isotope, such as gold-198, xenon-133, iodine-131, rubidium-86, chrominum-51, iron-59, antimony-124, strontium-85, cobalt-58, iridium-192, scandium-46, zinc-65, silver-110 cobalt-57, cobalt-60, iodine-131, scandium-46, zirconium-95, iridium-192, or krypton-85, for example.

5. Method Of Recovering Hydrocarbons And Other Resources Using Fracturing Fluid Compositions The present invention is also directed to a method for recovering hydrocarbons. This recovery may be via hydraulic fracturing. The fracturing fluid may be pumped down a wellbore and into a geologic formation.

The herein described method may be used to stimulate, for example, the production of various hydrocarbons from oil and gas wells, stimulate groundwater wells, precondition rock for caving or inducing rock to cave in mining operations, as a means to enhance waste remediation processes, usually hydrocarbon waste or spills, a method to measure the stress in the earth, and/or to extract heat to produce electricity in geothermal systems.

The equipment useful for fracturing with the fracturing fluid may include a slurry blender, a high pressure, high volume fracturing pump, and a monitoring unit. The equipment may also include a fracturing tank, storage units for handling of the proppant, low pressure flexible hoses, and gauges and meters for flow rate, fluid density, and treating pressure. Fracturing equipment may operate over a large range of pressures and injection rates. The pressures and rates may reach up to 100 megapascals and greater than 265 liters per second (9.4 cu ft/s).

The pressure and rate of the hydraulic system during the growth of a hydraulic fracture, as well as knowing the properties of the fluid and proppant being injected into the wellbore may be measured via the use of the fracturing fluid. This data, in combination with data related to the geology of the formation can be used to model information such as length, width and conductivity of a fracture, such as a propped fracture.

6. Method Of Improving Water Injection Wells Using Well Service Fluid Compositions The present invention is also directed to a method of improving the water injection characteristics of water injection wells used to support hydrocarbon production in water flood projects using the well service fluid composition. The present invention has multiple aspects, illustrated by the following non-limiting examples.

EXAMPLE 1

Described below is a method of preparing a mixture comprising an aqueous choline chloride (70 wt. % in water) and borate mineral (Ulexite) in the presence of a polyol (glycerol) co-solvent. A stable, aqueous suspension of a delayed borate crosslinker may be prepared by pre-mixing aqueous choline chloride (70%) and co-solvent glycerol, together in an amount of 60% of the total weight. Utilizing an overhead stirrer operated at approximately 600 rpm, powdered Ulexite of 40% total weight and having a particle size of smaller than about 200 mesh is added to the mixture and agitated for approximately 20 minutes at approximately 600 rpm. The resulting stable, aqueous suspension of a delayed borate crosslinker was homogenized for 1 minute at 13,500 rpm to eliminate the larger particle size tail end of the distribution, which aids uniformity. The base fluid utilized for delay time was: 25# β-guar hydrated for 10 minutes in a solution containing 0.5 GPT surfactant FFS100E+GPT biocide and pH adjusted by 11.1. Two GPT crosslinker suspensions were then added to the solution.

Representative mixtures of the present invention are provided in Table 1, wherein mixtures of various wt. ratios of a borate mineral, choline chloride, and a co-solvent are described. Table 1 also demonstrates the time required for crosslinking to occur (vortex closure time) in the Example mixtures described herein.

Table 1 shows that mixtures comprising glycerol (A-2 and A-3) can effectively be used to control the time it takes for crosslinking to occur. Specifically, Table 1 shows that crosslinking times decrease as the polyol wt. % increases. For instance, compared to (A-1), which contains no glycerol and has a crosslinking time of 300 sec., (A-2) comprises 10 wt. % glycerol and has a shorter crosslinking time of 145 sec, while (A-3) comprises 20 wt. % glycerol and has an even shorter crosslinking time of 55 sec.

TABLE 1

| | Compositions | | |
|---|---|---|---|
| | A-1 | A-2 | A-3 |
| Ulexite, g | 40 | 40 | 40 |
| Choline Chloride, g (70 wt % in water) | 60 | 50 | 40 |
| Glycerol, g | 0 | 10 | 20 |
| Crosslinking time*, M:S (Vortex closure time) | 5:00 | 2:25 | 0:55 |

*The base fluid utilized for delay time test was: 25# Beta Guar hydrated for ten minutes in a solution containing + 0.5 gpt surfactant FFS100E + 0.3 gpt biocide and pH adjusted to 11.1, then 2 gpt crosslinker suspension added into the solution.

EXAMPLE 2

Below is described a method of preparing a mixture comprising an aqueous choline chloride (70 wt. % in water) and borate mineral (Ulexite) in the presence of a polyol (ethylene glycol) co-solvent. A stable, aqueous suspension of a delayed borate crosslinker may be prepared by pre-mixing aqueous choline chloride (70%) and co-solvent ethylene glycol, together in an amount of 60% of the total weight. Then utilizing an overhead stirrer operated at approximately 600 rpm, powdered Ulexite of 40% total weight and having a particle size of smaller than about 200 mesh is added to the mixture and agitated for approximately 20 minutes. The resulting stable, aqueous suspension of a delayed borate crosslinker was homogenized for 1 minute at 13,500 rpm to eliminate the larger particle size tail end of the distribution, which aids uniformity. Representative mixtures of the present invention are provided in Table 2, wherein mixtures of various wt. ratios of a borate mineral, choline chloride, and a co-solvent are described. Table 2 also demonstrates the time required for crosslinking to occur (vortex closure time) in the Example mixtures described herein. The compositions and crosslinking times were listed in Table 2.

Table 2 shows that mixtures comprising ethylene glycol (B-2 and B-3) can effectively be used to control (shorten or lengthen) the time it takes for crosslinking to occur compared to a mixture where a co-solvent is absent (B-1). Specifically, Table 2 shows that crosslinking times decrease, with respect to (B-1), for a mixture comprising 20 wt. % ethylene glycol co-solvent (B-3). However, crosslinking times increase, with respect to (B-1), for a mixture comprising 10 wt. % ethylene glycol co-solvent (B-2).

TABLE 2

| | Compositions | | |
|---|---|---|---|
| | B-1 | B-2 | B-3 |
| Ulexite, g | 40 | 40 | 40 |
| Choline Chloride, g (70 wt % in water) | 60 | 50 | 40 |
| Ethlene glycol, g | 0 | 10 | 20 |
| Crosslinking time*, M:S (Vortex closure time) | 5:00 | 5:05 | 3:00 |

*The base fluid utilized for delay time test was: 25# Beta Guar hydrated for ten minutes in a solution containing + 0.5 gpt nonionic surfactant + 0.3 gpt biocide and pH adjusted to 11.1, then 2 gpt crosslinker suspension added into the solution.

EXAMPLE 3

Described below is a method of preparing a mixture comprising an aqueous choline chloride (70 wt. % in water) and borate mineral (Ulexite) in the presence of water. A stable, aqueous suspension of a delayed borate crosslinker may be prepared by pre-mixing aqueous choline chloride (70%) with additional water as co-solvent, together in an amount of 60% of the total weight. Then utilizing an overhead stirrer operated at approximately 600 rpm, powdered Ulexite of 40% total weight and having a particle size of smaller than about 200 mesh is added to the mixture and agitated for approximately 20 minutes. The resulting stable, aqueous suspension of a delayed borate crosslinker was homogenized for 1 minute at 13,500 rpm to eliminate the larger particle size tail end of the distribution, which aids uniformity.

Representative mixtures of the present invention are provided in Table 3, wherein mixtures of various wt. ratios of a borate mineral, choline chloride, and a co-solvent are described. Table 3 also demonstrates the time required for crosslinking to occur (vortex closure time) in the Example mixtures described herein. Table 3 shows that mixtures comprising water that is additional to premixed aqueous choline chloride solution described herein (C-2 and C-3) can effectively be used to control (shorten or lengthen) the time it takes for crosslinking to occur compared to a mixture where a co-solvent is absent (C-1). Specifically, Table 3 shows that crosslinking times decrease, with respect to (C-1), for a mixture comprising 20 wt. % more water (C-3). However, crosslinking times increase, with respect to (C-1), for a mixture comprising 10 wt. % more water (C-2).

TABLE 3

| | Compositions | | |
|---|---|---|---|
| | C-1 | C-2 | C-3 |
| Ulexite, g | 40 | 40 | 40 |
| Choline Chloride, g (70 wt % in water) | 60 | 50 | 40 |

TABLE 3-continued

|  | Compositions | | |
| --- | --- | --- | --- |
|  | C-1 | C-2 | C-3 |
| Water, g | 0 | 10 | 20 |
| Crosslinking time*, M:S (Vortex closure time) | 5:00 | 5:15 | 4:40 |

*The base fluid utilized for delay time test was: 25# Beta Guar hydrated for ten minutes in a solution containing + 0.5 gpt nonionic surfactant + 0.3 gpt biocide and pH adjusted to 11.1, then 2 gpt crosslinker suspension added into the solution.

EXAMPLE 4

This example describes a method of preparing a mixture comprising an aqueous choline chloride (70 wt. % in water) and borates (Ulexite and Borax). A stable, aqueous suspension of a delayed borate crosslinker may be prepared by pre-mixing aqueous choline chloride (70%) in an amount of 60% total weight with borax (sodium meta borate) in the amount ranging from 0-17.5% total weight utilizing an overhead stirrer operated at approximately 600 rpm for approximately 20 minutes. After the solution is effected, powdered Ulexite, ranging from 17.5 to 40% of the total weight and having a particle size of smaller than about 200 mesh is added to the mixture and agitation is continued for approximately 20 minutes. The resulting stable, aqueous suspension of a delayed borate crosslinker was homogenized for 1 minute at 13,500 rpm to eliminate the larger particle size tail end of the distribution, which aids uniformity. Representative mixtures of the present invention are provided in Table 4, wherein mixtures of various wt. ratios of a borate mineral, choline chloride, and a co-solvent are described. Table 4 also demonstrates the time required for crosslinking to occur (vortex closure time) in the Example mixtures described herein.

Table 4 shows that mixtures comprising both Ulexite and Borax (D-2 and D-3) can effectively be used to control the time it takes for crosslinking to occur. Specifically, Table 4 shows that crosslinking times decrease as the wt. % of Borax increases. For instance, compared to (D-1), which contains no Borax and has a crosslinking time of 300 sec., (D-2) comprises 2 wt. % Borax and has a shorter crosslinking time of 130 sec, while (D-3) comprises 17.5 wt. % Borax and has an even shorter crosslinking time of 16 sec.

TABLE 4

|  | Compositions | | |
| --- | --- | --- | --- |
|  | D-1 | D-2 | D-3 |
| Ulexite, g | 40 | 38 | 17.5 |
| Choline Chloride, g (70 wt % in water) | 60 | 60 | 65 |
| Borax, g | 0 | 2 | 17.5 |
| Crosslinking time*, M:S (Vortex closure time) | 5:00 | 2:10 | 0:16 |

*The base fluid utilized for delay time test was: 25# Beta Guar hydrated for ten minutes in a solution containing + 0.5 gpt nonionic surfactant + 0.3 gpt biocide and pH adjusted to 11.1, then 2 gpt crosslinker suspension added into the solution.

Examples 1-4 demonstrate that the presently claimed compositions, comprising choline chloride, a borate, and a co-solvent, are capable of controlling the time required for crosslinking of water soluble polymers.

EXAMPLE 5

The stability of the slurry is determined by aging studies at room temperature. The slurry manufactured is placed in long vials with caps to prevent evaporation and placed on lab bench over fixed periods of time and the separation of slurry is recorded as top clearance. The top clearance is measured as the portion of the liquid from the liquid top to the line of separation between the liquid and the suspension and then compared to the total amount of the liquid plus suspension. A typical stable, aqueous suspension as prepared in Examples 1-4 showed the following data.

| Time (hours) | % Top Clearance |
| --- | --- |
| 14 | 0.6 |
| 72 | 0.74 |
| 96 | 0.88 |
| 192 | 4.7 |

It is understood that the foregoing detailed description and accompanying examples are merely illustrative and are not to be taken as limitations upon the scope of the invention, which is defined solely by the appended claims and their equivalents.

Various changes and modifications to the disclosed embodiments will be apparent to those skilled in the art. Such changes and modifications, including without limitation those relating to the chemical structures, substituents, derivatives, intermediates, syntheses, compositions, formulations, or methods of use of the invention, may be made without departing from the spirit and scope thereof.

The invention claimed is:

1. A composition for crosslinking polymers in aqueous solution comprising from 5 wt. % to 60 wt. % of a crosslinking agent and from 5 wt. % to 95 wt. % of a base solution of aqueous choline salt, based on the total weight of the composition, wherein the crosslinking agent is in a stable solution or in a stable suspension and the particle size of the crosslinking agent is from about 20 mesh to about 400 mesh.

2. The composition of claim 1, wherein the base solution is aqueous choline chloride.

3. The composition of claim 1, further comprising an alcoholic or polyol co-solvent.

4. The composition of claim 1, wherein the base solution suspends the crosslinking agent.

5. The composition of claim 1, wherein the concentration of the aqueous choline salt is from 30 wt % to 70 wt % of the composition.

6. The composition of claim 3, wherein the concentration of the co-solvent is from 1 wt % to 50 wt % of the composition.

7. The composition to claim 6, wherein the concentration of the co-solvent is from 1 wt % to 30 wt % of the composition.

8. The composition of claim 6, wherein the concentration of the co-solvent is from 5 wt % to 15 wt % of the composition.

9. The composition of claim 1, wherein the crosslinking agents are transition metal containing compounds, the transition metal selected from the group consisting of titanium (4+), zirconium (4+) chromium (3+) iron (3+)and aluminum (3+), and the transition metal containing compounds release transition metal ions when dissolved in an aqueous liquid.

10. The composition of claim 1, wherein the crosslinking agent is a borate releasing compound.

11. The composition of claim 1, wherein the crosslinking agent is a mixture of a sparingly soluble alkali/alkaline earth metal borate and a slightly soluble borate.

12. The composition of claim 10, wherein the crosslinking agent is:
   (a) a sparingly soluble borate mineral selected from the group consisting of ulexite, colemanite, probertite, and a mixture thereof; or
   (b) a slightly soluble borate and/or borate oxide selected from the group consisting of boric acid, common borax, sodium tetraborate, another alkali or alkaline earth borate hydrate, and a mixture thereof;
   (c) or a mixture of (a) and (b).

13. The composition of claim 1, wherein the concentration of the crosslinking agent is from 15 wt % to 45 wt % of the composition.

14. The composition of claim 3, wherein the co-solvent is methanol, ethanol, 1- or 2-propanol, ethylene glycol, propylene glycol, glycerol, an alkyloxyethanol ether, diethylene glycol, an alkyldiethyleglycol ether, or a mixture thereof.

15. The composition of claim 1 further comprising a biocide, a pH adjuster, an antioxidant, or a combination thereof.

16. The composition of claim 1 wherein the crosslinking agent is in a stable suspension.

* * * * *